United States Patent
Chiang

(10) Patent No.: US 12,549,410 B2
(45) Date of Patent: Feb. 10, 2026

(54) NEMA EDGE GATEWAY

(71) Applicant: Agileiots Investment Co., Ltd., Taoyuan (TW)

(72) Inventor: Hung-Hsiang Chiang, Kaohsiung (TW)

(73) Assignee: AGILEIOTS INVESTMENT CO., LTD., Taoyuan (TW)

( * ) Notice: Subject to any disclaimer, the term of this patent is extended or adjusted under 35 U.S.C. 154(b) by 424 days.

(21) Appl. No.: 18/088,506

(22) Filed: Dec. 23, 2022

(65) Prior Publication Data

US 2023/0131414 A1    Apr. 27, 2023

Related U.S. Application Data

(63) Continuation-in-part of application No. 16/911,201, filed on Jun. 24, 2020, now abandoned.

(30) Foreign Application Priority Data

Jun. 28, 2019   (TW) ................... 108123014

(51) Int. Cl.
*H04L 12/40* (2006.01)
*H04L 12/66* (2006.01)
*H05B 47/175* (2020.01)
*H05B 47/18* (2020.01)

(52) U.S. Cl.
CPC ........ *H04L 12/40045* (2013.01); *H04L 12/66* (2013.01); *H05B 47/175* (2020.01); *H05B 47/18* (2020.01)

(58) Field of Classification Search
CPC .... H05B 47/19; H04L 12/40045; H04L 12/66
See application file for complete search history.

(56) References Cited

U.S. PATENT DOCUMENTS

| | | | |
|---|---|---|---|
| 11,711,705 B2 * | 7/2023 | Liao | H04W 16/18 370/254 |
| 2020/0173613 A1 * | 6/2020 | Zhang | H05B 45/20 |
| 2020/0300279 A1 * | 9/2020 | Root | F16B 2/12 |
| 2020/0303944 A1 * | 9/2020 | Jonsson | G01R 19/10 |
| 2020/0352013 A1 * | 11/2020 | Hutson | H05B 47/19 |
| 2020/0374980 A1 * | 11/2020 | Zimmerman, III | H04W 16/26 |
| 2020/0383173 A1 * | 12/2020 | Aaron | F21V 23/0435 |

FOREIGN PATENT DOCUMENTS

| | | | | |
|---|---|---|---|---|
| CN | 112152916 A | * | 12/2020 | H05B 47/18 |
| CN | 114007297 A | * | 2/2022 | H05B 45/30 |
| TW | M591746 U | * | 3/2020 | |
| WO | WO-2019136480 A2 | * | 7/2019 | H05B 47/11 |
| WO | WO-2019136488 A1 | * | 7/2019 | H05B 47/195 |
| WO | WO-2023052260 A1 | * | 4/2023 | H05B 47/19 |

* cited by examiner

Primary Examiner — Shean Tokuta
(74) Attorney, Agent, or Firm — LANWAY IPR SERVICES; Chun-Ming Shih

(57) ABSTRACT

A NEMA edge gateway is provided, which can be connected to a mobile communication network and can be used with a NEMA Luminaire of an existing streetlight to receive electrical energy from circuitry of the streetlight. The NEMA edge gateway can provide networking and power for a serial device and an IP device respectively, making both of them operate smoothly and able to be networked, and thereby expanding IoT applications. This is also to resolve difficulty in finding locations for placing gateways in order to greatly increase the number of gateways built in urban areas and fulfill increasing local communication service requirements.

18 Claims, 17 Drawing Sheets

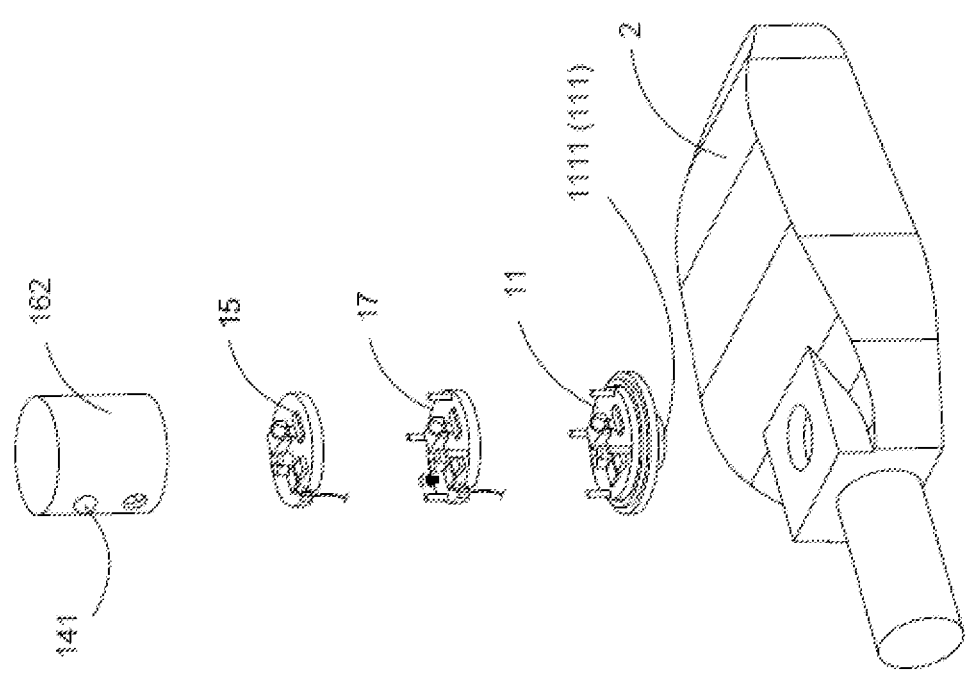

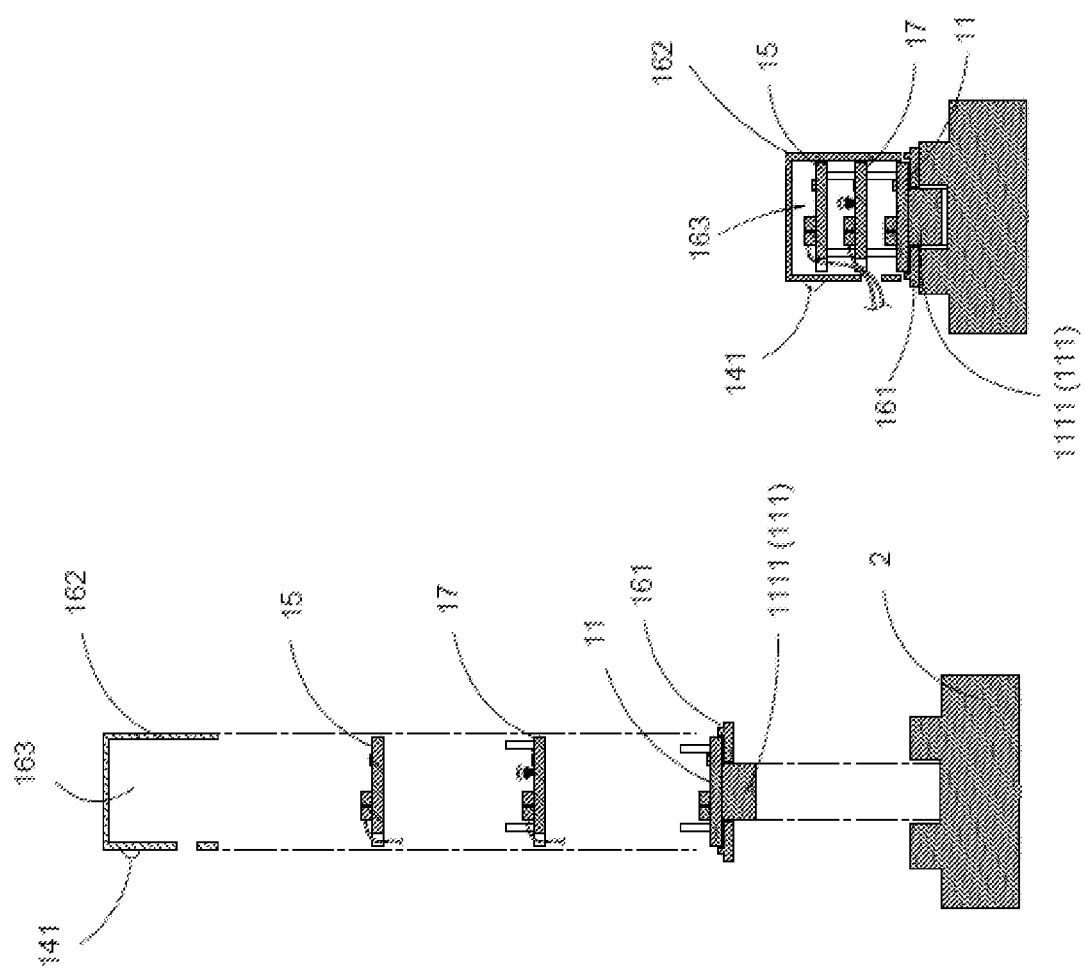

NEMA EDGE GATEWAY

CROSS-REFERENCE TO RELATED APPLICATIONS

This application claims the priority of Republic of China Patent Application No. 108123014 filed on Jun. 28, 2019, in the State Intellectual Property Office of the R.O.C., the disclosure of which is incorporated herein by reference.

BACKGROUND OF THE INVENTION

Field of the Invention

The present invention relates to communication facility fields, and more particularly, to a NEMA edge gateway that can be used with a NEMA Luminaire of an existing streetlight.

Descriptions of the Related Art 5G technology is booming globally, and it is expected that 5G is networked to everything in the future. Telecommunications providers have greatly upgraded current 4G (LTE) technology and widely applied Internet of Things (IoT) to infrastructures, supply chain logistics, asset management, environmental monitoring, etc.

Nowadays using mobile phones is so popular with mature and multiple 4G services being provided. For example, it is very convenient that people can use their mobile phones to check bus arriving timetables for nearby bus stops or look up estimated waiting time for their doctor appointments. The innovation of 5G technology leads to broad application of networking and IoT, such that IoT deployment becomes important. IoT deployment usually requires gateway devices to serve as common access points for different levels of networks such as local area network (LAN) and wide area network (WAN). It however becomes very difficult for the telecommunications providers to find where to locate the gateway devices as urban public land is getting less and less due to rapid urban development.

It is an important task in the art to find locations for placing gateways to greatly increase the number of gateways provided in urban areas and fulfill increasing local communication service requirements.

SUMMARY OF THE INVENTION

In view of the above drawbacks in the prior art, a primary object of the present invention is to provide a NEMA edge gateway, which can be mounted on a NEMA Luminaire of a streetlight and can provide networking and power for a serial device and an IP device respectively, so as to allow both the serial device and the IP device to operate smoothly and to be networked, thereby expanding applications of the Internet of Things (IoT).

To achieve the above and other objects, a NEMA edge gateway is provided in the invention, the NEMA edge gateway is for being used with a NEMA Luminaire, a serial device and an IP device, including: a NEMA motherboard including a NEMA port for being coupled to the NEMA Luminaire and electrically connected to the serial device; a Power Over Serial (POS) module mounted on the NEMA motherboard and electrically connected to the NEMA port, and for providing networking and power for the serial device via the NEMA port; a mobile communication network module for providing a mobile communication network; a Power Over Ethernet (POE) module for being coupled to the IP device and for providing networking and power for the IP device; and a network processing module electrically connected to the mobile communication network module, the POE module and the POS module, and for allowing the mobile communication network module to provide the mobile communication network for the POE module and the POS module.

Preferably, in the NEMA edge gateway said above, wherein further including: a streetlight dimming control module mounted on the NEMA motherboard and electrically connected to the NEMA port, and for controlling brightness of the NEMA Luminaire via the NEMA port.

Preferably, in the NEMA edge gateway said above, wherein further including: a power supply module electrically connected to the NEMA port to receive electrical energy, wherein the electrical energy serves as a power source for the streetlight dimming control module, the POS module, the mobile communication network module, the POE module and the network processing module.

Preferably, in the NEMA edge gateway said above, wherein further including: a network status indicating module electrically connected to the network processing module and for displaying a status of the network processing module or mobile communication network.

Preferably, in the NEMA edge gateway said above, wherein further including: an encryption and decryption module electrically connected to the network processing module and for performing encryption and decryption on signals processed by the network processing module.

Preferably, in the NEMA edge gateway said above, wherein the network processing module includes a clock synchronization unit for performing clock synchronization on signals processed by the network processing module.

Preferably, in the NEMA edge gateway said above, wherein the mobile communication network module includes a positioning module for providing positioning information for the network processing module.

Preferably, in the NEMA edge gateway said above, wherein the mobile communication network module, the network processing module and the POE module are mounted on the NEMA motherboard.

Preferably, in the NEMA edge gateway said above, wherein further including: a POE daughterboard, wherein the POE module is mounted on the POE daughterboard.

Preferably, in the NEMA edge gateway said above, wherein including: a NEMA base and a NEMA case, wherein the NEMA base carries the NEMA motherboard; the NEMA port has a coupling end exposed from the NEMA base and for being coupled to the NEMA Luminaire; and the NEMA case covers the NEMA base, and the NEMA motherboard and the POE daughterboard are stacked in layers within a receiving space formed between the NEMA case and the NEMA base.

Preferably, in the NEMA edge gateway said above, wherein further including: a network daughterboard, wherein the mobile communication network module and the network processing module are mounted on the network daughterboard.

Preferably, in the NEMA edge gateway said above, wherein further including: a POE daughterboard and a network daughterboard, wherein the network processing module and the POE module are mounted on the POE daughterboard, and the mobile communication network module is mounted on the network daughterboard.

Preferably, in the NEMA edge gateway said above, wherein further including: a NEMA base and a NEMA case, wherein the NEMA base carries the NEMA motherboard; the NEMA port has a coupling end exposed from the NEMA base and for being coupled to the NEMA Luminaire; and the NEMA case covers the NEMA base, and the NEMA motherboard, the network daughterboard and the POE daughterboard are stacked in layers within a receiving space formed between the NEMA case and the NEMA base.

Furthermore, the present invention further provides a NEMA edge gateway for being used with a NEMA Luminaire, a without power cord serial device and an IP device, including: an antenna module; a circuit board material having a NEMA connector for being coupled to the NEMA Luminaire, wherein the NEMA connector has a data stream positive polarity pin and a data stream negative polarity pin; a without power cord serial device network power supply module mounted on the circuit board material and electrically connected to the data stream positive polarity pin and the data stream negative polarity pin of the NEMA connector, and for supplying power to the without power cord serial device via the data stream positive polarity pin and the data stream negative polarity pin; an IP device network power supply module for supplying power to the IP device; a communication network module for transmitting or receiving a communication network message through the antenna module to provide a communication network through the communication network message; and a network processing module for connecting the without power cord serial device network power supply module and the IP device network power supply module to the communication network through the communication network module, wherein the without power cord serial device can transmit or receive the communication network message via the data stream positive polarity pin and the data stream negative polarity pin through the without power cord serial device network power supply module, and the IP device can transmit or receive the communication network message through the IP device network power supply module.

Preferably, in the NEMA edge gateway said above, wherein the communication network module can transmit or receive the communication network message via a mobile communication technology.

Preferably, the NEMA edge gateway said above wherein the IP device network power supply module has an optical transceiver for the transmission or reception of the communication network message.

Preferably, the NEMA edge gateway said above further includes a RTK positioning module for providing real-time dynamic positioning for the network processing module through RTK positioning technology.

Preferably, the NEMA edge gateway said above further is used with a with power cord serial device, and further includes: a with power cord serial device network supply module for connecting the with power cord serial device to the communication network through the network processing module.

Preferably, the NEMA edge gateway said above further includes: a satellite communication network module for enabling the communication network module to transmit or receive the communication network message through satellite communication technology.

Preferably, the NEMA edge gateway said above wherein the satellite communication network module has a duplexer and an amplifier, wherein the duplexer can transmit or receive the communication network message respectively, and the amplifier can provide message amplification processing for the transmission or reception of the communication network message.

Preferably, the NEMA edge gateway said above further includes: a NEMA power supply module for receiving the electric energy of the NEMA Luminaire through the NEMA connector and providing the received electric energy to the without power cord serial device network power supply module and the IP device network power supply module respectively.

Preferably, the NEMA edge gateway said above further includes: a solar power supply module for converting solar energy into electrical energy and providing the converted electrical energy to the without power cord serial device network power supply module and the IP device network power supply module respectively.

Preferably, the NEMA edge gateway said above further includes: a battery power supply module for storing electrical energy and providing the stored electrical energy to the without power cord serial device network power supply module and the IP device network power supply module respectively.

Preferably, the NEMA edge gateway said above further includes: a clock synchronization module for providing clock synchronization processing for the power supply of the IP device network power supply module.

Preferably, the NEMA edge gateway said above wherein the circuit board material further includes a NEMA motherboard, a network daughterboard and a POE daughterboard, wherein the NEMA connector and the without power cord serial device network power supply module are mounted on the NEMA motherboard; the communication network module is mounted on the network daughterboard; and the IP device network power supply module is mounted on the POE daughterboard.

Preferably, the NEMA edge gateway said above wherein the network processing module is mounted on the network daughterboard; and the clock synchronization module is mounted on the POE daughterboard.

Preferably, the NEMA edge gateway said above wherein the network processing module and the clock synchronization module are respectively mounted on the POE daughterboard.

Preferably, the NEMA edge gateway said above wherein the network processing module and the clock synchronization module are respectively mounted on the network daughterboard.

Preferably, the NEMA edge gateway said above further includes: a gateway base and a gateway housing, wherein the gateway housing is assembled on the gateway base to form a gateway assembly having a gateway internal space; the circuit board material is disposed in the gateway internal space; and the antenna module is disposed in the gateway internal space or on the gateway housing.

Preferably, the NEMA edge gateway said above further includes: an optical-electrical hybrid transmission cable for connecting the IP device network power supply module to the IP device; the NEMA edge gateway further includes a gateway spacer installed in the gateway housing to separate the gateway internal space into a board placement subspace and a cable placement subspace; and the circuit board material is disposed in the board accommodating subspace, and the optical-electrical hybrid transmission cable is accommodated in the cable placement subspace.

Preferably, the NEMA edge gateway said above further includes: a steering structure for turning to the gateway assembly and making the transmission or reception direction of the antenna module meet expectation.

In summary, the NEMA edge gateway of the present invention can be connected to a mobile communication network and can be used with a NEMA Luminaire of an existing streetlight to receive electrical energy from circuitry of the streetlight. Thus, the NEMA edge gateway can provide networking and power for a serial device and an IP device respectively, making both of them operate smoothly and able to be networked, and thereby broadening IoT applications. This is also to resolve difficulty in finding locations for placing gateways in order to greatly increase the number of gateways built in urban areas and fulfill increasing local communication service requirements.

BRIEF DESCRIPTION OF THE DRAWINGS

The above and other aspects, features and other advantages of the present invention will be more clearly understood from the following detailed description taken in conjunction with the accompanying drawings, in which:

FIGS. 5 to 7-2 are schematic diagrams showing a usage status of applying the NEMA edge gateway to a street light according to the present invention.

DETAILED DESCRIPTION OF THE PREFERRED EMBODIMENT

Figure 1:
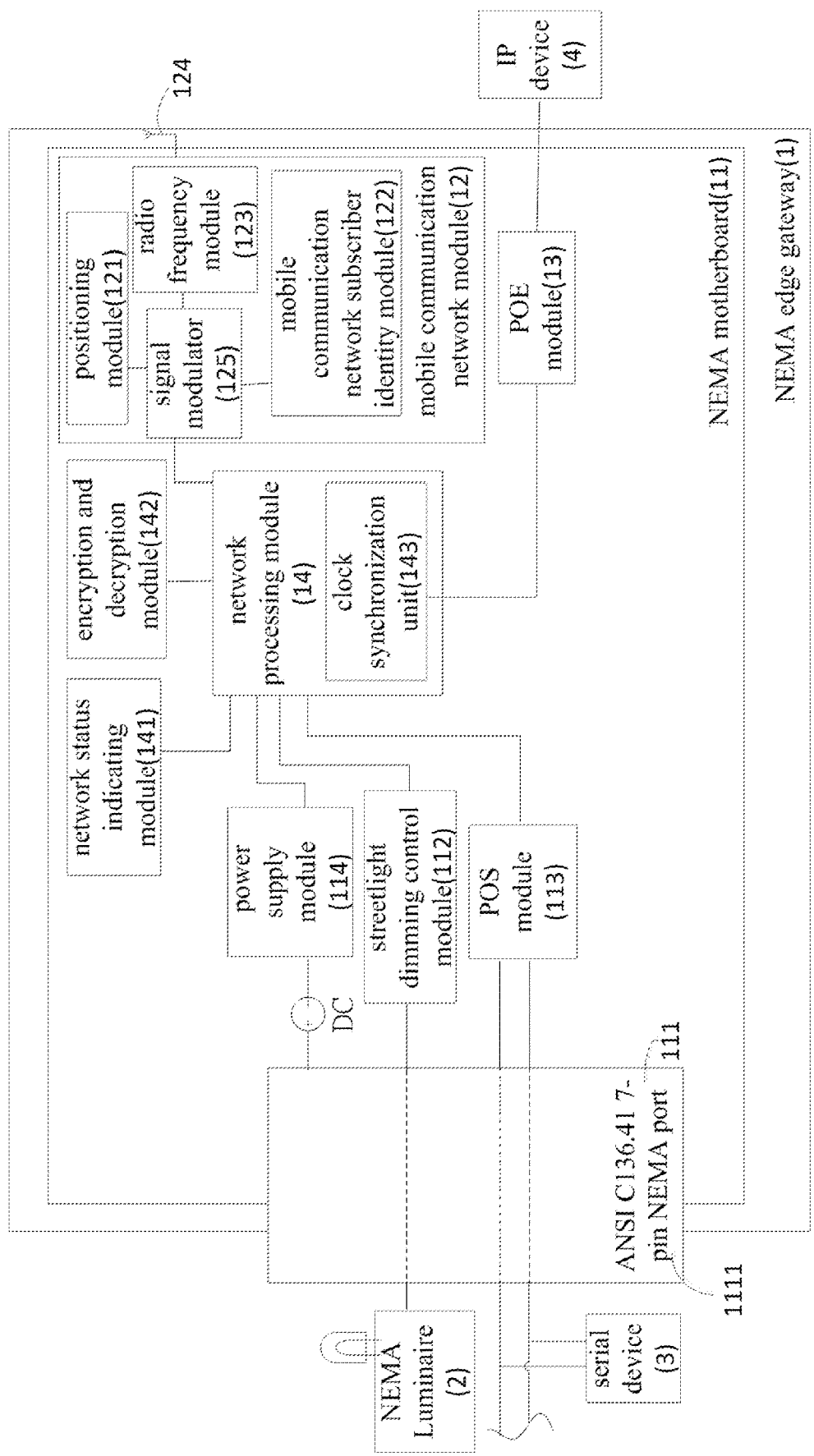
FIGS. 1 to 4 are basic system architectural block diagrams of a NEMA edge gateway according to preferred embodiments of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

The present invention provides a NEMA edge gateway, which is described below according to its preferred embodiments with reference to FIGS. 1 to 16.

In order to make the disclosure more concise and easier to understand, the same or similarly functioning elements in the following embodiments will be described with the same symbols, and the description of the same or equivalent features will be omitted.

As shown in FIG. 1, the NEMA edge gateway 1 can be used with a NEMA Luminaire 2 of an existing streetlight, a serial device 3 (such as a sensor) and an IP device 4 (such as an IP camera). The NEMA edge gateway 1 includes: a NEMA motherboard 11, a streetlight dimming control module 112, a Power Over Serial (POS) module 113, a power supply module 114, a mobile communication network module 12, a Power Over Ethernet (POE) module 13 and a network processing module 14.

The NEMA motherboard 11 includes a NEMA port 111 such as ANSI C136.41 7-pin NEMA port. The NEMA port 111 can be coupled to the NEMA Luminaire 2 of the streetlight and electrically connected to the serial device 3, allowing the power supply module 114 to receive electrical energy from circuitry of the streetlight, wherein the electrical energy serves as a power source provided for operation of the streetlight dimming control module 112, POS module 113, mobile communication network module 12, POE module 13 and network processing module 14.

The mobile communication network module 12 can be electrically connected to the network processing module 14 to provide a mobile communication network (such as NB-IOT, 4G or 5G) for the network processing module 14. The mobile communication network module 12 includes a positioning module 121, a mobile communication network subscriber identity module 122, a radio frequency module 123, an antenna module 124 and a signal modulator 125. The positioning module 121 is, for example, Global Positioning System (GPS) that can provide positioning information for the network processing module 14. The mobile communication network module 12 can be integrally formed on the NEMA motherboard 11, or can be mounted on a separate circuit board other than the NEMA motherboard 11 and connected to the NEMA motherboard 11 by an interface such as Mini PCIE. The mobile communication network subscriber identity module 122 is, for example, Subscriber Identity Module (SIM) for storing subscriber identification data. The signal modulator 125 is, for example, modulator-demodulator (Modem), for modulating digital signals to analog signals or modulating analog signals to digital signals so as to allow transmission of the modulated signals.

The streetlight dimming control module 112 is mounted on the NEMA motherboard 11 and electrically connected to the NEMA port 111, and can control brightness of the NEMA Luminaire 2 via the NEMA port 111. The POS module 113 is mounted on the NEMA motherboard 11 and electrically connected to the NEMA port 111, and can provide electrical energy for operation of the serial device 3 via the NEMA port 111. The POE module 13 can be coupled to the IP device 4 to provide electrical energy for operation of the IP device 4.

The network processing module 14 is electrically connected to the mobile communication network module 12, the POE module 13 and the POS module 113 respectively. This allows the mobile communication network module 12 to provide the mobile communication network for the POE module 13 and the POS module 113 respectively, allows the POS module 113 to provide networking for the serial device 3, and allows the POE module 13 to provide networking for the IP device 4, such that the serial device 3 and the IP device 4 both can be networked when in operation, thereby expanding IoT applications.

As shown in FIGS. 1 to 4, the network processing module 14 of the NEMA edge gateway 1 includes a clock synchronization unit 143 using, for example, IEEE 1588 Precision Time Protocol (PTP), for performing clock synchronization on signals processed by the network processing module 14.

Figure 5:
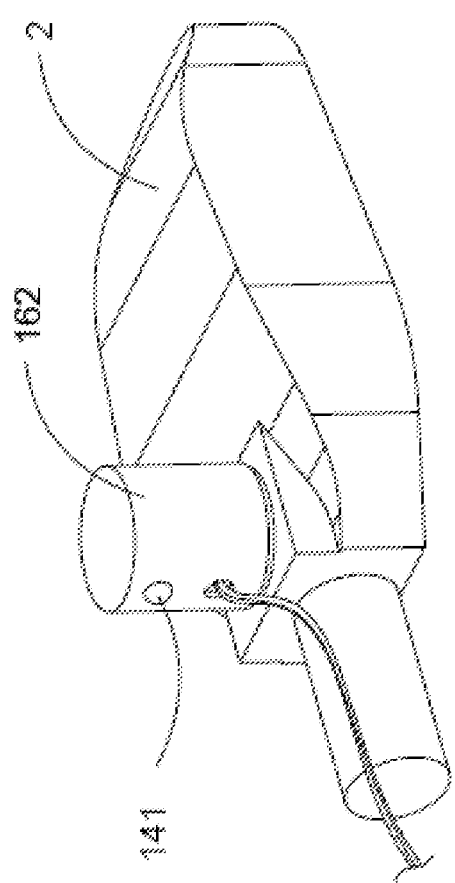

As shown in FIG. 5, the NEMA edge gateway 1 further includes a network status indicating module 141 electrically connected to the network processing module 14, for retrieving an operating status of the network processing module 14 and indicating it using, for example, a light signal, or for retrieving and indicating a status (such as speed) of the mobile communication network of the mobile communication network module 12, such that a managing person can only use the network status indicating module 141, without other detection equipment, to visually monitor the operating status of the network processing module 14 or the status of the mobile communication network.

As shown in FIGS. 1 to 4, the NEMA edge gateway 1 further includes an encryption and decryption module 142 electrically connected to the network processing module 14, for performing encryption and decryption on signals processed by the network processing module 14, to prevent the signals processed by the network processing module 14 from being hacked and thereby meet network information safety requirements.

Figure 2:
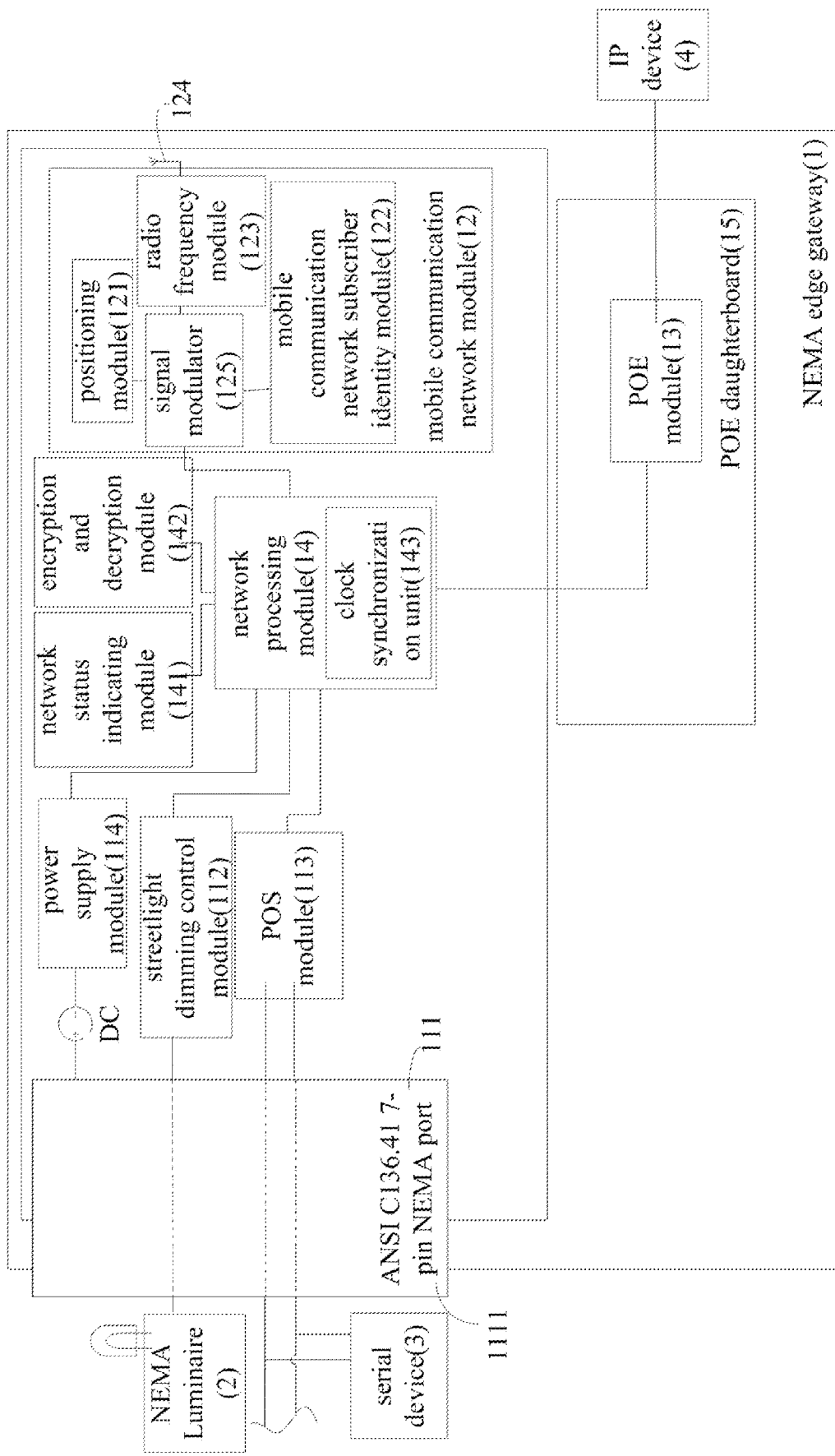
Figure 3:
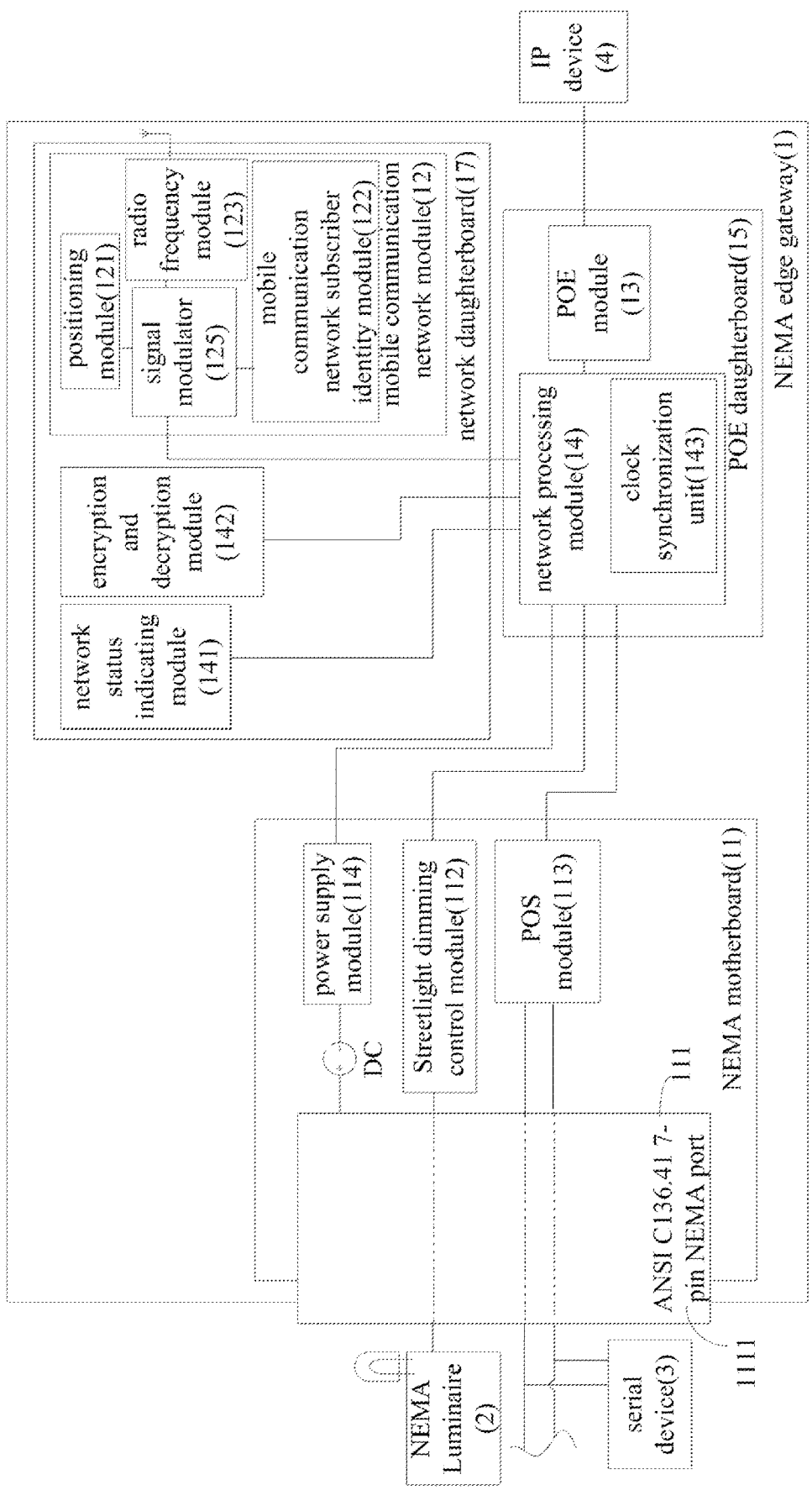
Figure 4:
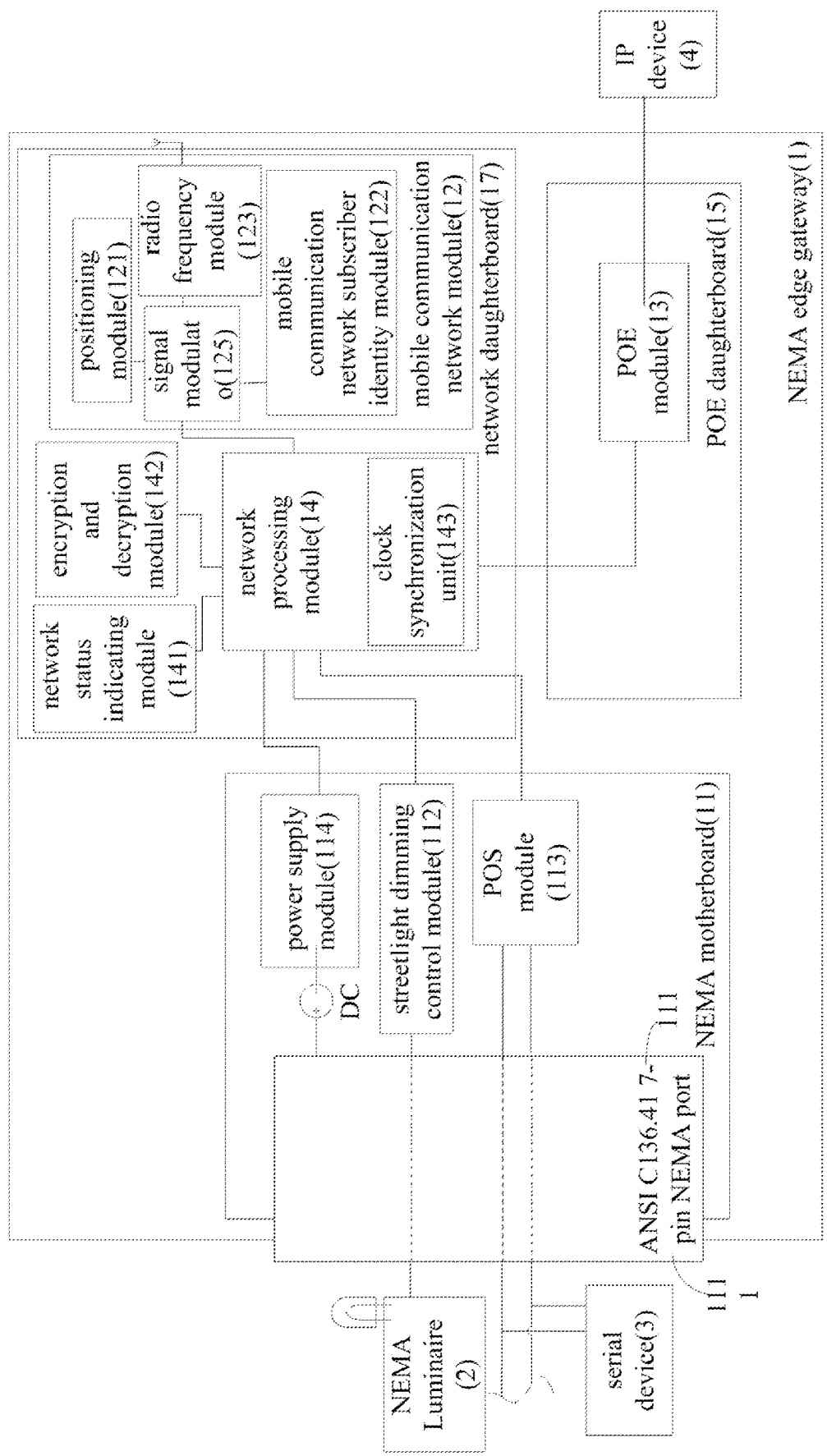

As shown in FIG. 1, the mobile communication network module 12, the POE module 13 and the network processing module 14 are mounted on the NEMA motherboard 11. This is not the only configuration. Alternatively, as shown in FIG. 2, the NEMA edge gateway 1 allows the POE module 13 to be mounted on a POE daughterboard 15 other than the NEMA motherboard 11, so as to reduce size of the NEMA motherboard 11. Alternatively, as shown in FIG. 3, the NEMA edge gateway 1 allows the network processing module 14 and the POE module 13 to be mounted on a POE daughterboard 15 other than the NEMA motherboard 11, and allows the mobile communication network module 12 to be mounted on a network daughterboard 17 other than the NEMA motherboard 11, so as to reduce size of the NEMA motherboard 11. Alternatively, as shown in FIG. 4, the NEMA edge gateway 1 allows the mobile communication network module 12 and the network processing module 14 to be mounted on a network daughterboard 17 other than the NEMA motherboard 11, so as to reduce size of the NEMA motherboard 11.

Figure 6:
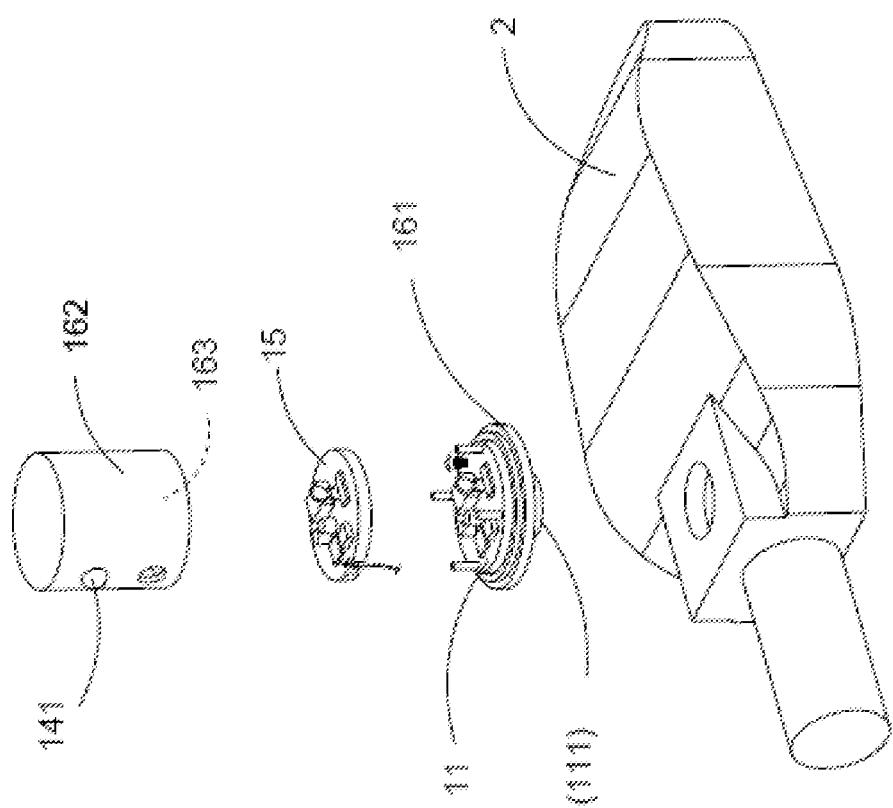
Figure 8:
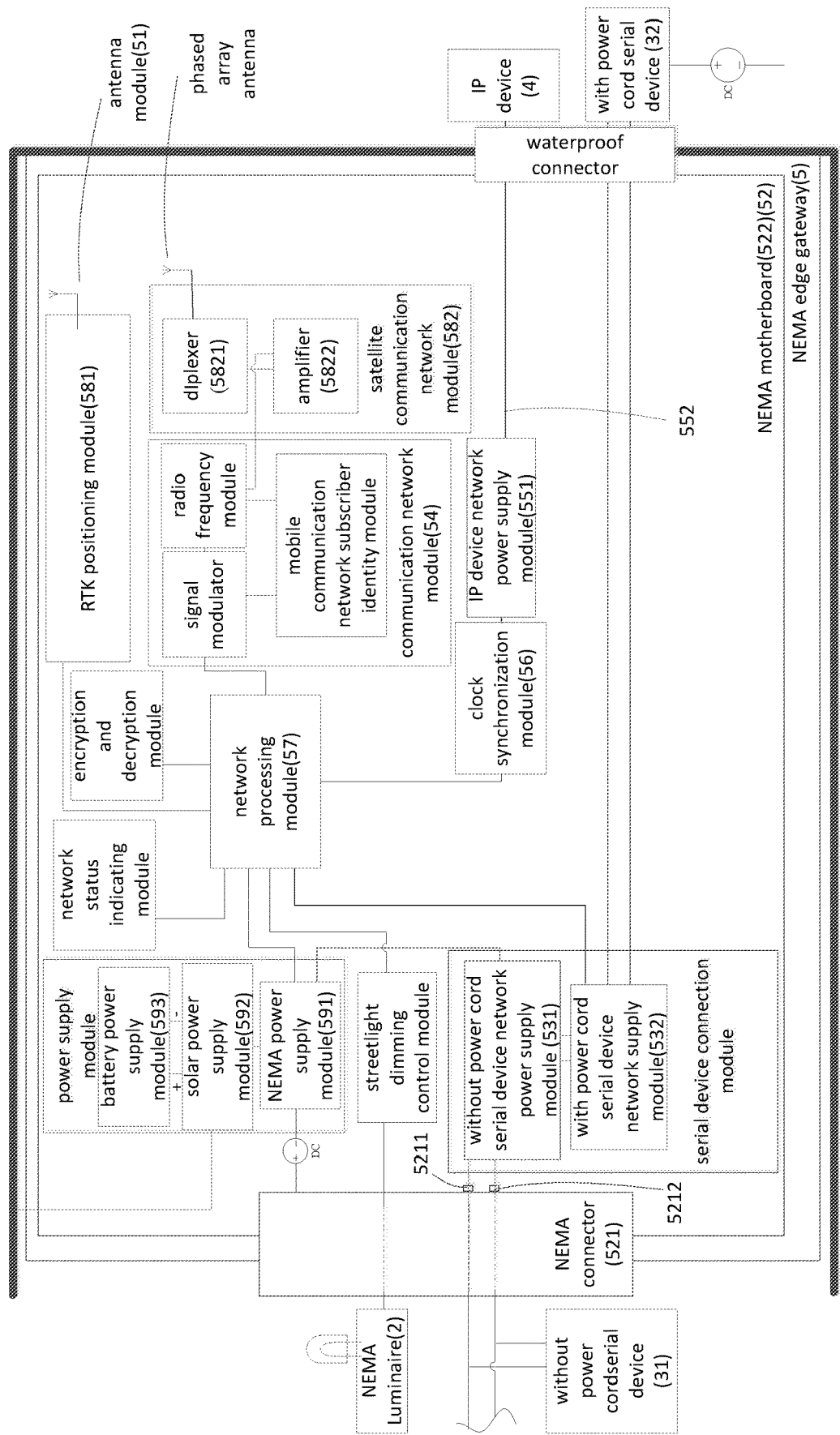
FIGS. 8 to 12 are basic system architectural block diagrams of a NEMA edge gateway according to preferred embodiments of the present invention.
Figure 9:
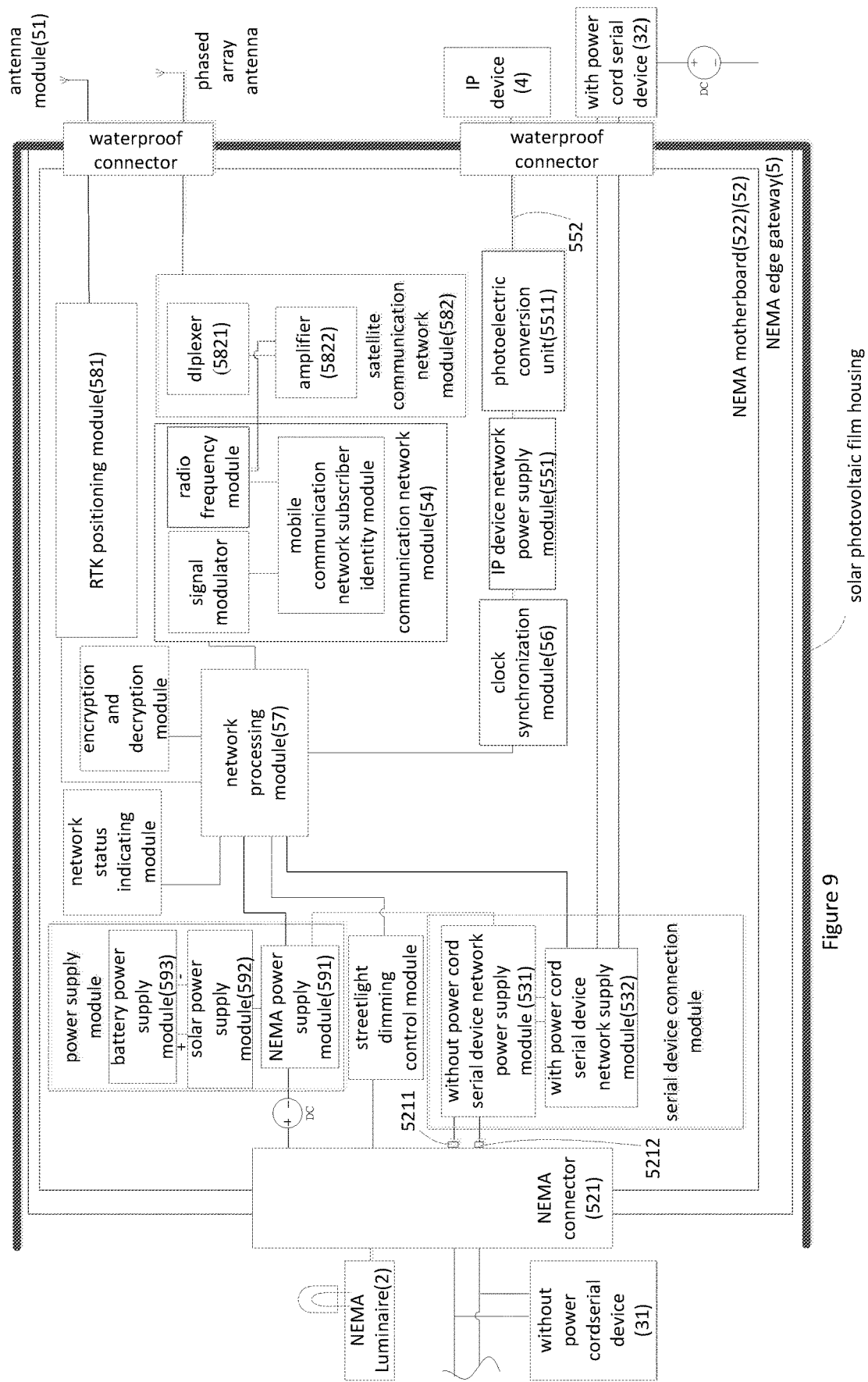

As shown in FIGS. 5 to 7-2, the NEMA edge gateway 1 further includes a NEMA base 161 and a NEMA case 162, wherein the NEMA base 161 carries the NEMA motherboard 11. The NEMA port 111 has a coupling end 1111 exposed from the NEMA base 161 and for being coupled to the NEMA Luminaire 2. The NEMA case 162 covers the NEMA base 161, with a receiving space 163 being formed between the NEMA case 162 and the NEMA base 161. As shown in FIG. 6, the NEMA motherboard 11 and the POE daughterboard 15 are stacked in layers and received in the receiving space 163 so as to reduce sizes of the NEMA base 161 and NEMA case 162. As shown in FIG. 7, the NEMA motherboard 11, the network daughterboard 17 and the POE daughterboard 15 are stacked in layers and received in the receiving space 163 so as to reduce sizes of the NEMA base 161 and NEMA case 162.

Therefore, the present invention provides a NEMA edge gateway having a standard NEMA port, which can be coupled to a NEMA Luminaire of a streetlight to receive electrical energy from circuitry of the streetlight. The NEMA edge gateway further includes a POS module and a POE module, for providing networking and power for a serial device and an IP device respectively, making both of them operate smoothly and able to be networked, and thereby expanding IoT applications.

Moreover, as streetlights are widely distributed in urban areas and the NEMA edge gateway of the present invention can be used with a NEMA Luminaire of an existing streetlight, there is no need to find other places for putting the NEMA edge gateway of the present invention. This thereby effectively resolves difficulty in finding locations for placing gateways in order to greatly increase the number of gateways built in urban areas and fulfill increasing local communication service requirements.

In the embodiments shown in FIGS. 8 to 16 of the present application, NEMA edge gateway 5 can be used with a NEMA Luminaire 2, a without power cord serial device 31, a with power cord serial device 32 and an IP device 4. The without power cord serial device 31 does not have a built-in power cord that can be connected to an external power supply, and the with power cord serial device 32 has a built-in power cord that can be connected to an external power supply.

The NEMA edge gateway 5 includes: an antenna module 51, a circuit board material 52, a without power cord serial device network power supply module 531, a with power cord serial device network supply module 532, a communication network module 54, an IP device network power supply module 551, clock synchronization module 56, a network processing module 57, a RTK positioning module 581 (The RTK refers to Real Time Kinematic), satellite communication network module 582, NEMA power supply module 591, a solar power supply module 592 and a battery power supply module 593.

The circuit board material 52 includes a NEMA connector 521 such as ANSI C136.41 7-pin NEMA connector, so the NEMA connector 521 has a data stream positive polarity pin 5211 and a data stream negative polarity pin 5212.

The NEMA power supply module 591 is respectively connected to the NEMA connector 521, the without power cord serial device network power supply module 531 and the IP device network power supply module 551, so that the NEMA power supply module 591 can receive the electric energy of the NEMA Luminaire 2 through the NEMA connector 521 and provide the received electric energy to the without power cord serial device network power supply module 531 and the IP device network power supply module 551 respectively.

The solar power supply module 592 can convert solar energy into electrical energy, and the battery power supply module 593 can store electrical energy. In the embodiments shown in FIGS. 8 to 16 of the present application, the solar power supply module 592 and the battery power supply module 593 can be respectively connected to the without power cord serial device network power supply module 531 and the IP device network power supply module 551 to provide power to the without power cord serial device network power supply module 531 and the IP device network power supply module 551 respectively.

The without power cord serial device network power supply module 531 is mounted on the circuit board material 52 and electrically connected to the data stream positive polarity pin 5211 and the data stream negative polarity pin 5212 of the NEMA connector 521, so that the without power cord serial device network power supply module 531 can provide power for the without power cord serial device 31 via the data stream positive polarity pin 5211 and the data stream negative polarity pin 5212.

The IP device network power supply module 551 can be connected to the network equipment 4 to supply power to the IP device 4, and the clock synchronization module 56 can be connected to the IP device network equipment power supply module 551 to provide clock synchronization processing for the IP device network power supply module 551.

The communication network module 54 can be connected to the antenna module 51 to transmit or receive a communication network message via a mobile communication technology to provide a communication network. However, it is not limited to this, the communication network module 54 can be connected to the antenna module 51 through the satellite communication network module 582, so as to transmit or receive the communication network message through satellite communication technology.

The satellite communication network module 582 has a duplexer 5821 and an amplifier 5822, wherein the duplexer 5821 can transmit or receive the communication network message respectively, and the amplifier 5822 can provide message amplification processing for the transmission or reception of the communication network message.

The network processing module 57 is respectively connected to the communication network module 54, the connecting the without power cord serial device network power supply module 531 and the IP device network power supply module 551, so that the communication network module 54 can be used to connect the without power cord serial device network power supply module 531 and the IP device network power supply module 551 to the communication network, enable the without power cord serial device 31 can transmit or receive the communication network message via the data stream positive polarity pin 5211 and the data stream negative polarity pin 5212 through the without power cord serial device network power supply module 531, and enable the IP device 4 can transmit or receive the communication network message through the IP device network power supply module 551. In the embodiments shown in FIG. 9 of the present application, the IP device network power supply module 551 has an optical transceiver 5511 for the transmission or reception of the communication network message through optical-electrical conversion.

The RTK positioning module 581 is connected to the network processing module 57, so that the RTK positioning module 581 can provide real-time dynamic positioning for network processing module 57 by RTK positioning technology.

The network processing module 57 is connected to the with power cord serial device network supply module 532, and the with power cord serial device network supply module 532 is connected to the communication network through the communication network module 54. The with power cord serial device network supply module 532 is connected to the with power cord serial device 32, so that the with power cord serial device 32 can be connected to the communication network through the network processing module 57

The circuit board material 52 can be composed of multiple circuit boards and has a NEMA motherboard 522, a network daughterboard 523 and a POE daughterboard 524. In the embodiments shown in FIGS. 8 to 16 of the present application, the NEMA connector 521 and the without power cord serial device network power supply module 531 are mounted on the NEMA motherboard 522; the communication network module 54 is mounted on the network daughterboard 523; and the IP device network power supply module 551 is mounted on the POE daughterboard 524.

Figure 10:
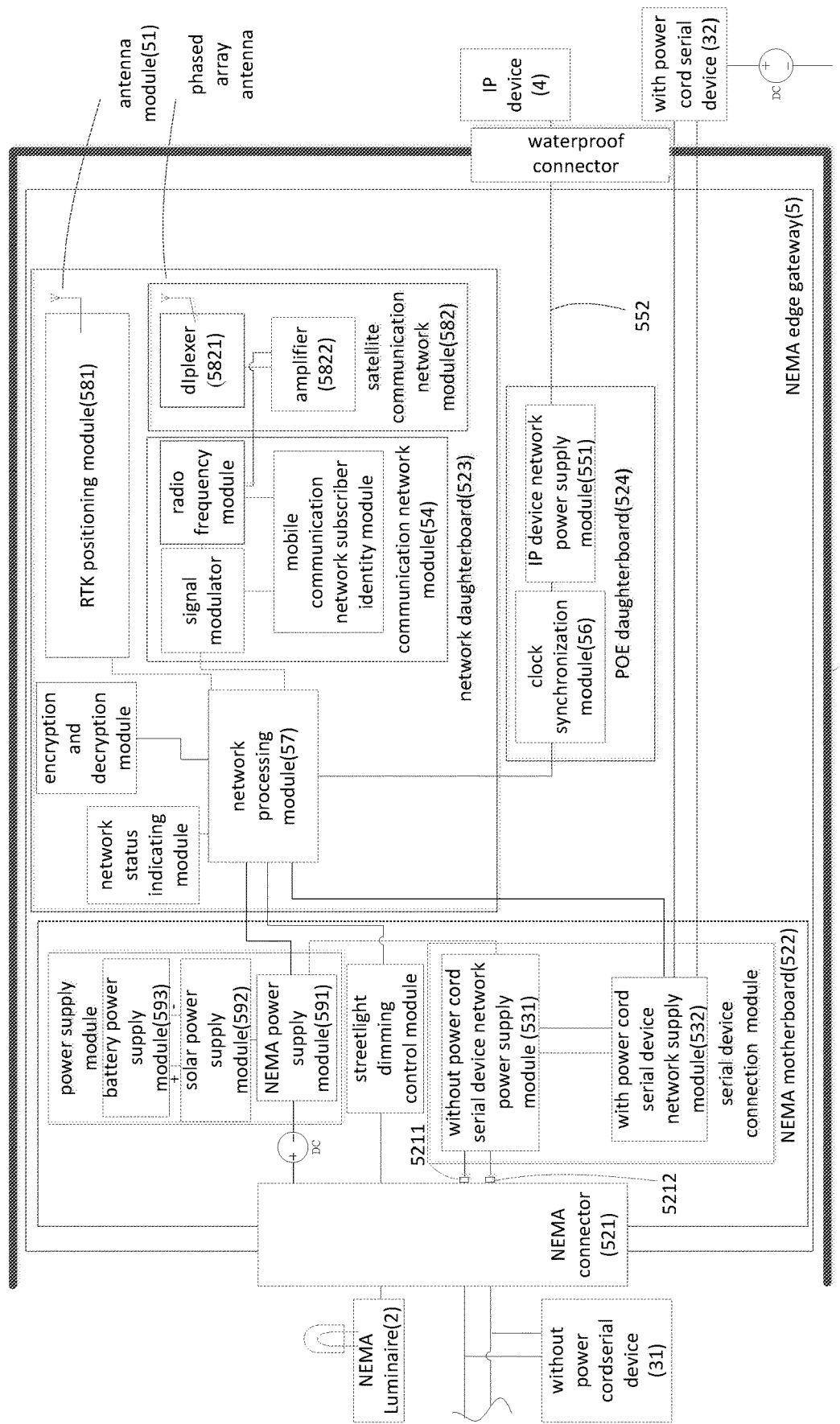

In the embodiment shown in FIG. 10 of the present application, the network processing module 57 is mounted on the network daughterboard 523; and the clock synchronization module 56 is mounted on the POE daughterboard 524.

Figure 11:
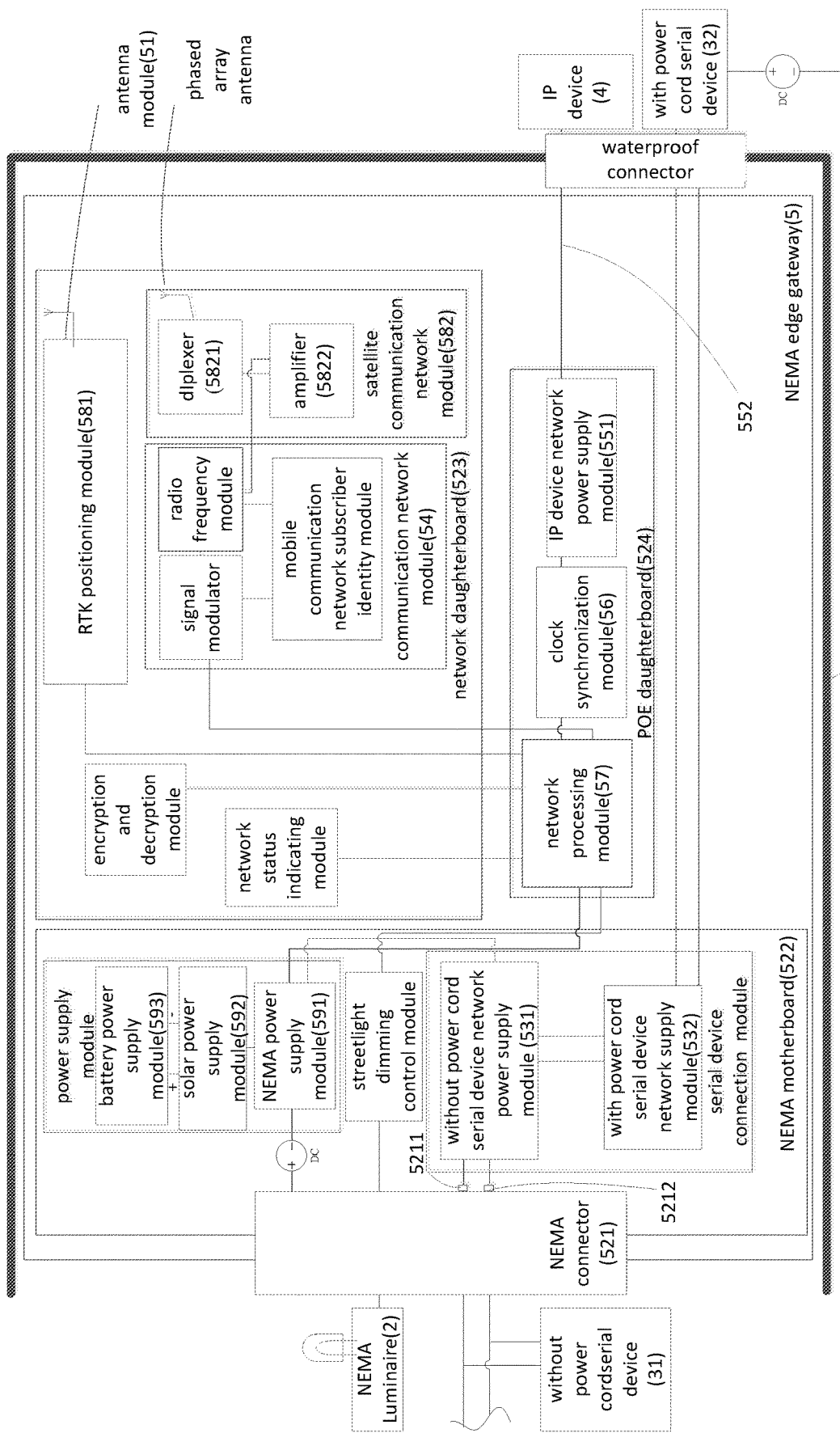
Figure 12:
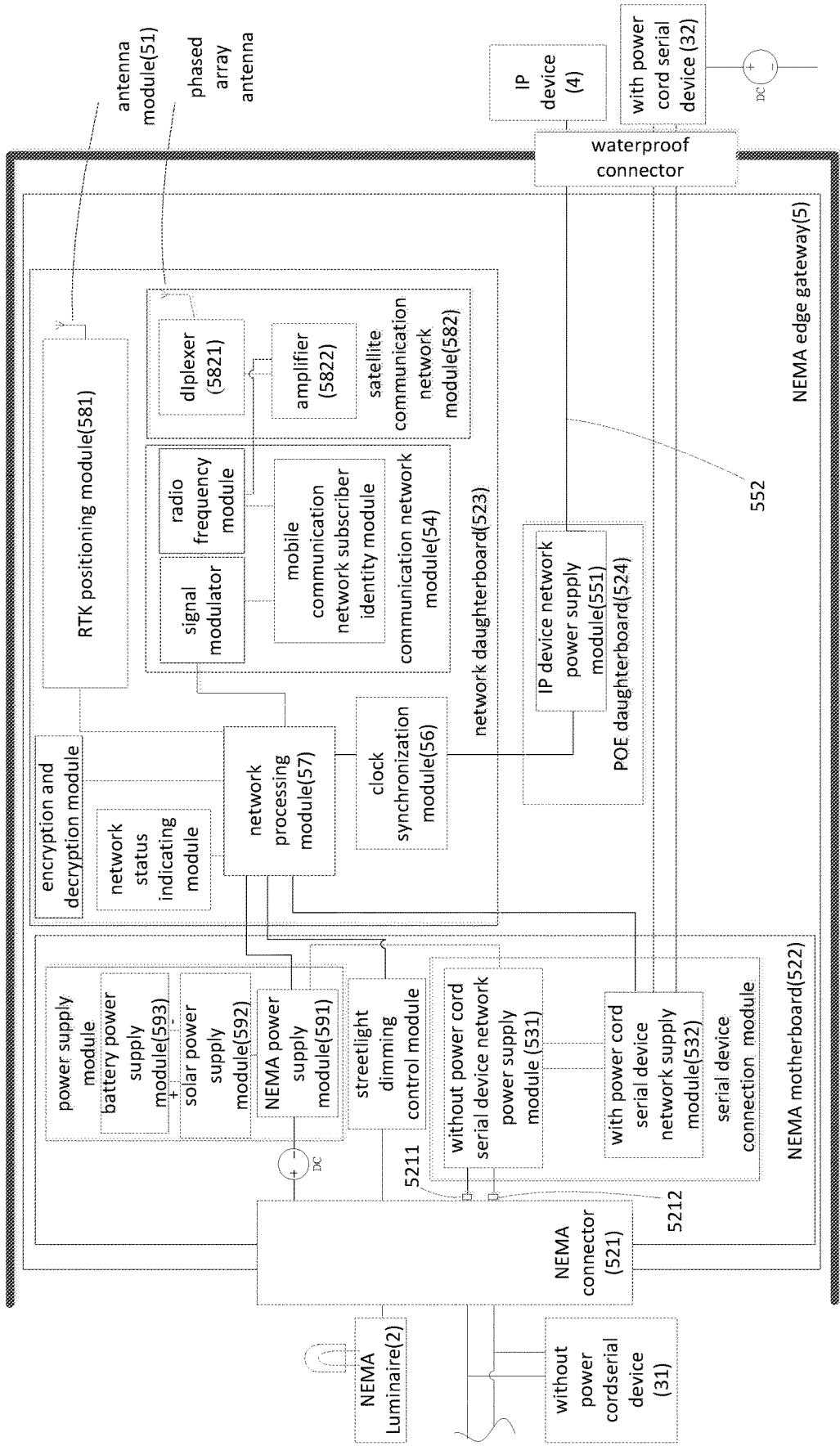
Figure 13:
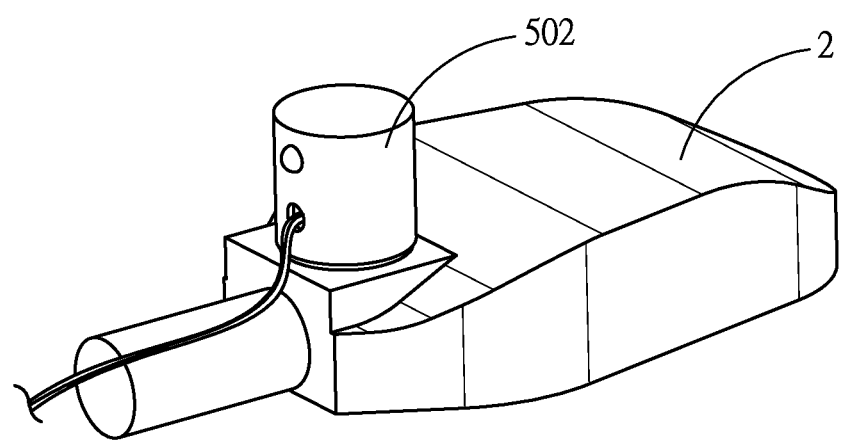
FIGS. 13 to 16 are schematic diagrams showing a usage status of applying the NEMA edge gateway to a street light according to the present invention.
Figure 14:
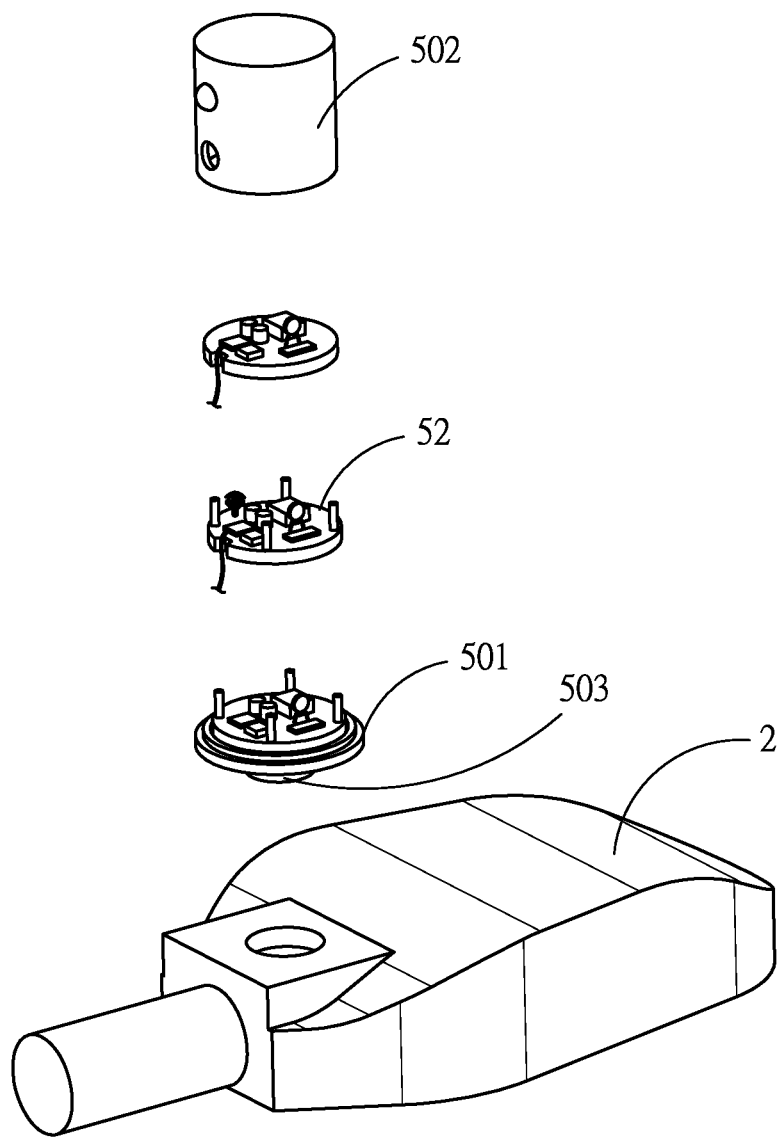
Figure 15:
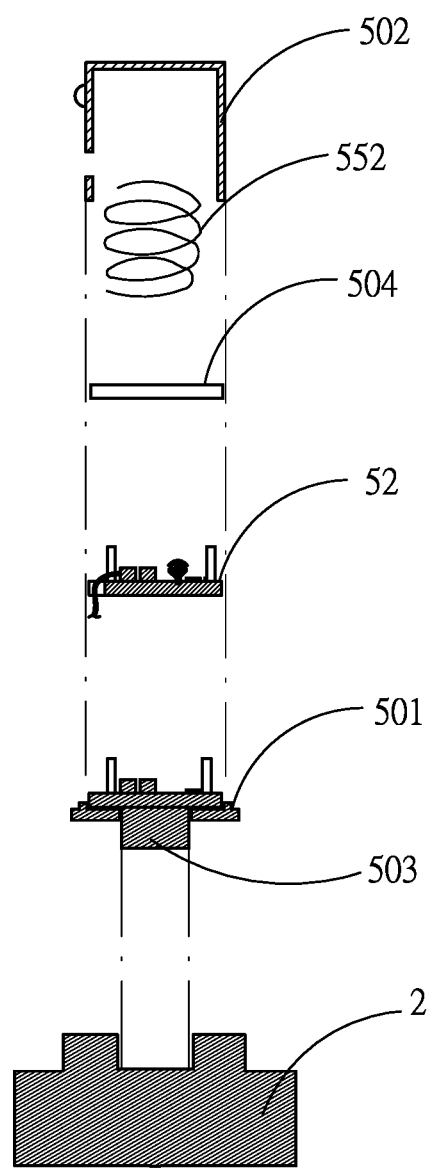
Figure 16:
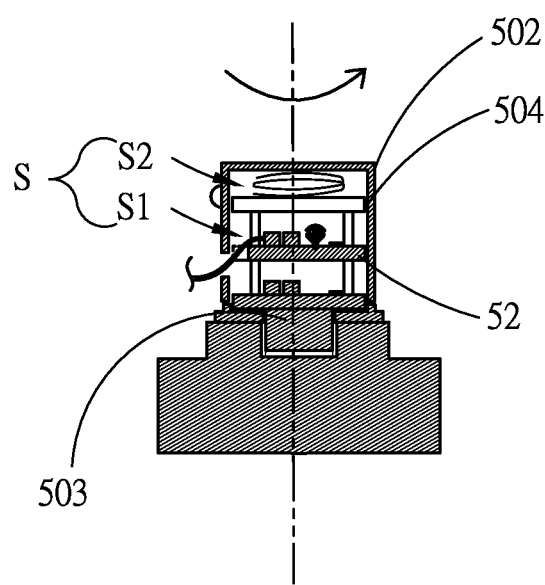

However, it is not limited to this as shown in FIG. 11, the network processing module 57 and the clock synchronization module 56 are mounted on the POE daughterboard 524 respectively, and the communication network module 54 is mounted on the network daughterboard 523. The network processing module 57, the IP device network power supply module 551 and the clock synchronization module 56 are mounted on the POE daughterboard 524. In the embodiment shown in FIG. 12, the network processing module 57 and the clock synchronization module 56 are mounted on the network daughterboard 523 respectively.

In the embodiments shown in FIGS. 13 to 16 of the present application, the NEMA edge gateway 5 includes a gateway base 501, a gateway housing 502, a steering structure 503, a gateway spacer 504 and an optical-electrical hybrid transmission cable 552, wherein the gateway housing 502 is assembled on the gateway base 501 to form a gateway assembly B having a gateway internal space S. The circuit board material 52 is disposed in the gateway internal space S, and the antenna module 51 is disposed in the gateway internal space S or on the gateway housing 502. It should be noted that the steering structure 503 can turn to the gateway assembly B and making the transmission or reception direction of the antenna module 51 meet expectation.

The optical-electrical hybrid transmission cable 552 can connect the IP device network power supply module 551 to the IP device 4, so that the IP device network power supply module can supply power to the IP device 4 and connect the IP device 4 to the communication network. The gateway spacer 504 is installed in the gateway housing 502 to separate the gateway internal space S into a board placement subspace S1 and a cable placement subspace S2; and the circuit board material 52 is disposed in the board accommodating subspace S1, and the optical-electrical hybrid transmission cable 552 is accommodated in the cable placement subspace S2, so that the circuit board material 52 can be separated from the optical-electrical hybrid transmission cable 552 to prevent the circuit board material 52 from interfering with the optical-electrical hybrid transmission cable 552.

The examples above are only illustrative to explain principles and effects of the invention, but not to limit the invention. It will be apparent to those skilled in the art that modifications and variations can be made without departing from the scope of the invention. Therefore, the protection range of the rights of the invention should be as defined by the appended claims.

What is claimed is:

1. A NEMA edge gateway for being used with a NEMA Luminaire, a without power cord serial device and an IP device, including:
   an antenna module;
   a circuit board material having a NEMA connector for being coupled to the NEMA Luminaire, wherein the NEMA connector has a data stream positive polarity pin and a data stream negative polarity pin;
   a without power cord serial device network power supply module mounted on the circuit board material and electrically connected to the data stream positive polarity pin and the data stream negative polarity pin of the NEMA connector, and for supplying power to the without power cord serial device via the data stream positive polarity pin and the data stream negative polarity pin;
   an IP device network power supply module for supplying power to the IP device;
   a communication network module for transmitting or receiving a communication network message through the antenna module to provide a communication network through the communication network message;
   a network processing module for connecting the without power cord serial device network power supply module and the IP device network power supply module to the communication network through the communication network module, wherein the without power cord serial device can transmit or receive the communication network message via the data stream positive polarity pin and the data stream negative polarity pin through the without power cord serial device network power supply module, and the IP device can transmit or receive the communication network message through the IP device network power supply module; and a clock synchronization module for providing clock synchronization processing for the power supply of the IP device network power supply module.

2. The NEMA edge gateway according to claim 1, wherein the communication network module can transmit or receive the communication network message via a mobile communication technology.

3. The NEMA edge gateway according to claim 1, wherein the IP device network power supply module has an optical transceiver for the transmission or reception of the communication network message.

4. The NEMA edge gateway according to claim 1, further including: a RTK positioning module for providing real-time dynamic positioning for the network processing module through RTK positioning technology.

5. The NEMA edge gateway according to claim 1, further being used with a with power cord serial device, and further including: a with power cord serial device network supply module for connecting the with power cord serial device to the communication network through the network processing module.

6. The NEMA edge gateway according to claim 1, further including: a satellite communication network module for enabling the communication network module to transmit or receive the communication network message through satellite communication technology.

7. The NEMA edge gateway according to claim 6, wherein the satellite communication network module has a duplexer and an amplifier, wherein the duplexer can transmit or receive the communication network message respectively, and the amplifier can provide message amplification processing for the transmission or reception of the communication network message.

8. The NEMA edge gateway according to claim 1, further including: a NEMA power supply module for receiving the electric energy of the NEMA Luminaire through the NEMA connector and providing the received electric energy to the without power cord serial device network power supply module and the IP device network power supply module respectively.

9. The NEMA edge gateway according to claim 1, further including: a solar power supply module for converting solar energy into electrical energy and providing the converted electrical energy to the without power cord serial device network power supply module and the IP device network power supply module respectively.

10. The NEMA edge gateway according to claim 1, further including: a battery power supply module for storing electrical energy and providing the stored electrical energy to the without power cord serial device network power supply module and the IP device network power supply module respectively.

11. The NEMA edge gateway according to claim 1, wherein the circuit board material further includes a NEMA motherboard, a network daughterboard and a POE daughterboard, wherein the NEMA connector and the without power cord serial device network power supply module are mounted on the NEMA motherboard; the communication network module is mounted on the network daughterboard; and the IP device network power supply module is mounted on the POE daughterboard.

12. The NEMA edge gateway according to claim 11, wherein the network processing module is mounted on the network daughterboard; and the clock synchronization module is mounted on the POE daughterboard.

13. The NEMA edge gateway according to claim 11, wherein the network processing module and the clock synchronization module are respectively mounted on the POE daughterboard.

14. The NEMA edge gateway according to claim 11, wherein the network processing module and the clock synchronization module are respectively mounted on the network daughterboard.

15. The NEMA edge gateway according to claim 1, further including: a gateway base and a gateway housing, wherein the gateway housing is assembled on the gateway base to form a gateway assembly having a gateway internal space; the circuit board material is disposed in the gateway internal space; and the antenna module is disposed in the gateway internal space or on the gateway housing.

16. The NEMA edge gateway according to claim 15, further including: an optical-electrical hybrid transmission cable for connecting the IP device network power supply module to the IP device; the NEMA edge gateway further includes a gateway spacer installed in the gateway housing to separate the gateway internal space into a board placement subspace and a cable placement subspace; and the circuit board material is disposed in the board accommodating subspace, and the optical-electrical hybrid transmission cable is accommodated in the cable placement subspace.

17. The NEMA edge gateway according to claim 15, further including: a steering structure for turning to the gateway assembly and making the transmission or reception direction of the antenna module meet expectation.

18. A NEMA edge gateway for being used with a NEMA Luminaire, a without power cord serial device and an IP device, including:
    an antenna module;
    a circuit board material having a NEMA connector for being coupled to the NEMA Luminaire, wherein the NEMA connector has a data stream positive polarity pin and a data stream negative polarity pin;
    a without power cord serial device network power supply module mounted on the circuit board material and electrically connected to the data stream positive polarity pin and the data stream negative polarity pin of the NEMA connector, and for supplying power to the without power cord serial device via the data stream positive polarity pin and the data stream negative polarity pin;
    an IP device network power supply module for supplying power to the IP device;
    a communication network module for transmitting or receiving a communication network message through the antenna module to provide a communication network through the communication network message;
    a network processing module for connecting the without power cord serial device network power supply module and the IP device network power supply module to the communication network through the communication network module, wherein the without power cord serial device can transmit or receive the communication network message via the data stream positive polarity pin and the data stream negative polarity pin through the without power cord serial device network power supply module, and the IP device can transmit or receive the communication network message through the IP device network power supply module; and
    a solar power supply module for converting solar energy into electrical energy and providing the converted electrical energy to the without power cord serial device network power supply module and the IP device network power supply module respectively.

* * * * *